US012510254B2

(12) United States Patent
Akkadi et al.

(10) Patent No.: US 12,510,254 B2
(45) Date of Patent: Dec. 30, 2025

(54) ACTIVE VENTING CONTROL SYSTEM

(71) Applicant: WHIRLPOOL CORPORATION, Benton Harbor, MI (US)

(72) Inventors: Siddappa Yallappa Akkadi, Yadwad (IN); Anna D'Angelo, Novara (IT); Ankur Garg, Pune (IN); Reshma Rishikesh Jadhav, Pune (IN); Suraj Narendra Kadam, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 629 days.

(21) Appl. No.: 17/862,625

(22) Filed: Jul. 12, 2022

(65) Prior Publication Data

US 2024/0019130 A1    Jan. 18, 2024

(51) Int. Cl.
*F24C 15/32* (2006.01)
*F23J 13/08* (2006.01)

(52) U.S. Cl.
CPC ............ *F24C 15/322* (2013.01); *F23J 13/08* (2013.01)

(58) Field of Classification Search
CPC ...... F24C 15/322; F24C 7/085; F24C 15/006; F24C 15/2007; F24C 15/327; F23J 13/08
USPC ...................................... 126/21 A
See application file for complete search history.

(56) References Cited

U.S. PATENT DOCUMENTS

| 655,761 A | 8/1900 | Culver |
| 1,043,252 A | 11/1912 | Revell et al. |
| 1,225,769 A * | 5/1917 | Chambers ............... F24C 3/085 126/39 F |
| 3,006,333 A * | 10/1961 | Niemann ............ F24C 15/2007 126/299 R |
| 3,207,058 A * | 9/1965 | Gaylord .................. A62C 3/04 55/DIG. 36 |
| 6,131,336 A * | 10/2000 | Krause ................. B60H 1/3414 49/73.1 |

(Continued)

FOREIGN PATENT DOCUMENTS

| CN | 111102615 A * | 5/2020 | ............. F24C 15/20 |
| CN | 111750397 A * | 10/2020 | .......... F24C 15/2042 |

(Continued)

OTHER PUBLICATIONS

Chinese to English machine translation for CN_111102615_A (Year: 2020).*

(Continued)

*Primary Examiner* — Michael G Hoang
*Assistant Examiner* — Elizabeth Ann Laughlin
(74) *Attorney, Agent, or Firm* — Price Heneveld LLP

(57) ABSTRACT

A cooking appliance includes an internal support defining a cooking cavity. An upper wrapper is disposed above the internal support. A separator plate is disposed adjacent to the upper wrapper. A venting channel is defined between the separator plate and the upper wrapper. A chimney is coupled to the internal support and the upper wrapper. The chimney fluidly couples the cooking cavity and the venting channel. A venting assembly is coupled to the upper wrapper and includes an actuator and a cover. A controller is configured to activate the actuator to at least one of vertically and rotationally adjust the cover relative to a vent opening in the upper wrapper to control an amount of steam in the cooking cavity in response to a sensed humidity.

20 Claims, 11 Drawing Sheets

(56) References Cited

U.S. PATENT DOCUMENTS

| | | | |
|---|---|---|---|
| 9,427,107 B2 | 8/2016 | Reinhart | |
| 9,857,084 B2 * | 1/2018 | Hildner | F24C 15/2007 |
| 10,816,218 B2 | 10/2020 | Langhammer et al. | |
| 10,852,005 B2 | 12/2020 | Faraldi et al. | |
| 2002/0029804 A1 * | 3/2002 | Liorati | F16K 31/0651 |
| | | | 137/486 |
| 2007/0271574 A1 * | 11/2007 | Yoguchi | G11B 17/0515 |
| | | | 720/626 |
| 2008/0110879 A1 * | 5/2008 | Marchand | F24C 15/2007 |
| | | | 219/757 |
| 2018/0328099 A1 * | 11/2018 | Whitaker | E05F 15/41 |
| 2020/0300479 A1 | 9/2020 | Chadwick et al. | |

FOREIGN PATENT DOCUMENTS

| | | | | |
|---|---|---|---|---|
| DE | 102008040398 A1 * | 1/2010 | | A21B 3/04 |
| EP | 3428544 A1 * | 1/2019 | | F24C 15/2007 |
| EP | 3428545 A1 * | 1/2019 | | F24C 15/2007 |
| FR | 2465162 A2 | 3/1981 | | |
| JP | 58106335 A * | 6/1983 | | F24C 15/2007 |
| KR | 20200036523 A * | 9/2018 | | A01K 1/0076 |
| WO | WO-2004003451 A1 * | 1/2004 | | F24D 19/1009 |

OTHER PUBLICATIONS

Chinese to English machine translation for CN_111750397_A (Year: 2020).*

German to English machine translation for DE_102008040398_A1 (Year: 2010).*

German to English machine translation for EP_3428544_A1 (Year: 2019).*

German to English machine translation for EP_3428545_A1 (Year: 2019).*

Japanese to English machine translation for JP_58106335_A (Year: 1983).*

Korean to English machine translation for KR20200036523A (Year: 2018).*

Italian to English machine translation for WO_2004003451_A1 (Year: 2004).*

* cited by examiner

ACTIVE VENTING CONTROL SYSTEM

BACKGROUND OF THE DISCLOSURE

The present disclosure generally relates to an active venting control system, and more specifically, to an active venting control system for a cooking appliance.

SUMMARY OF THE DISCLOSURE

According to one aspect of the present disclosure, a cooking appliance includes an internal support defining a cooking cavity. An upper wrapper is disposed above the internal support. A venting assembly is coupled to the upper wrapper. The venting assembly includes a chimney, an actuator, and a cover. The chimney is coupled to the internal support and the upper wrapper. The chimney fluidly couples the cooking cavity and a venting channel. The cover is operably coupled to the actuator. A controller is configured to activate the actuator to at least one of vertically and rotationally adjust the cover relative to the chimney.

According to another aspect of the present disclosure, a ventilation system for a cooking appliance includes an internal support defining a cooking cavity. An upper wrapper is disposed proximate to the internal support. The upper wrapper at least partially defines a venting channel. A venting assembly is coupled to the upper wrapper. The venting assembly includes a chimney in fluid communication with the venting channel via the vent opening. The venting channel is in fluid communication with the cooking cavity via the vent opening and the chimney. The venting assembly also includes an actuator, an actuator shaft operably coupled to the actuator, and a cover operably coupled to the actuator shaft. The actuator is configured to drive rotation of the actuator shaft, which, consequently, causes rotation of the cover relative to the vent opening to open and close the vent opening. A controller is communicatively coupled with the venting assembly. The controller is configured to activate the venting assembly to open the vent opening.

According to yet another aspect of the present disclosure, a ventilation system for a cooking appliance includes an internal support defining a cooking cavity. An upper wrapper is disposed proximate to the internal support. The upper wrapper at least partially defines a venting channel in fluid communication with the cooking cavity via a vent opening defined in the upper wrapper and a chimney. A venting assembly is coupled to the upper wrapper. The venting assembly includes a solenoid valve operable between an activated state and a deactivated state. A cover is disposed proximate to the solenoid valve and the vent opening. A controller is communicatively coupled to the venting assembly, wherein the controller is configured to adjust the solenoid valve to the activated state to vertically move the cover relative to the vent opening to open the vent opening.

These and other features, advantages, and objects of the present disclosure will be further understood and appreciated by those skilled in the art by reference to the following specification, claims, and appended drawings.

Figure 1:
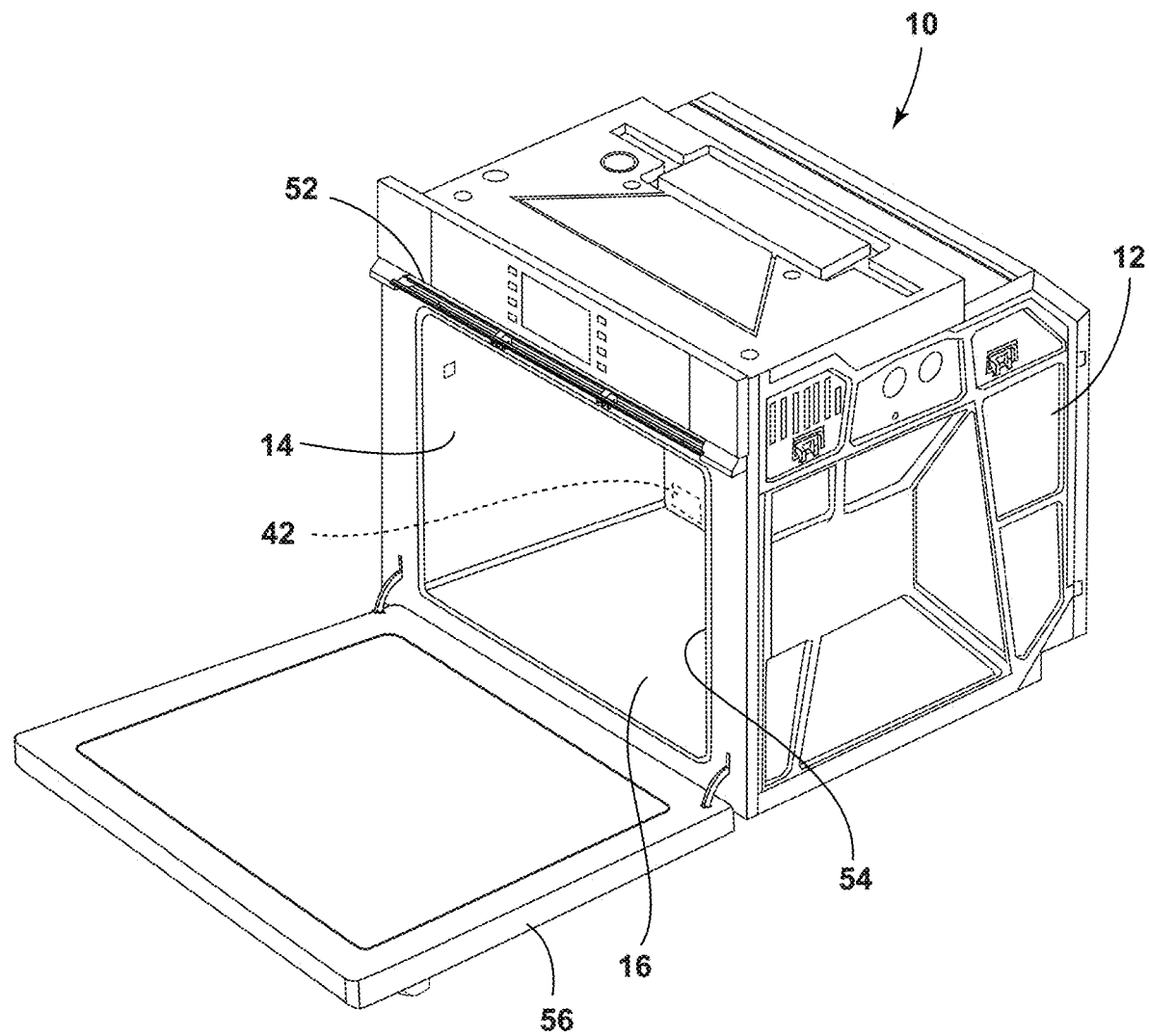
FIG. 1 is a side perspective view of a cooking appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an active venting control system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-12, reference numeral 10 generally designates a cooking appliance 10 that includes a body 12 with an internal support 14 defining a cooking cavity 16. An upper wrapper 22 is disposed above the internal support 14. A separator plate 24 is disposed adjacent to the upper wrapper 22. A venting channel 26 is defined between the separator plate 24 and upper wrapper 22. A chimney 28 is coupled to the internal support 14 and the upper wrapper 22. The chimney 28 fluidly couples the cooking cavity 16 and the venting channel 26. A venting assembly 30 is coupled to the upper wrapper 22 within venting channel 26. The venting assembly 30 includes an actuator 32 and a cover 34. A controller 36 is configured to activate the actuator 32 to at least one of vertically and rotationally adjust the cover 34 relative to a vent opening 38 of the upper wrapper 22.

Figure 2:
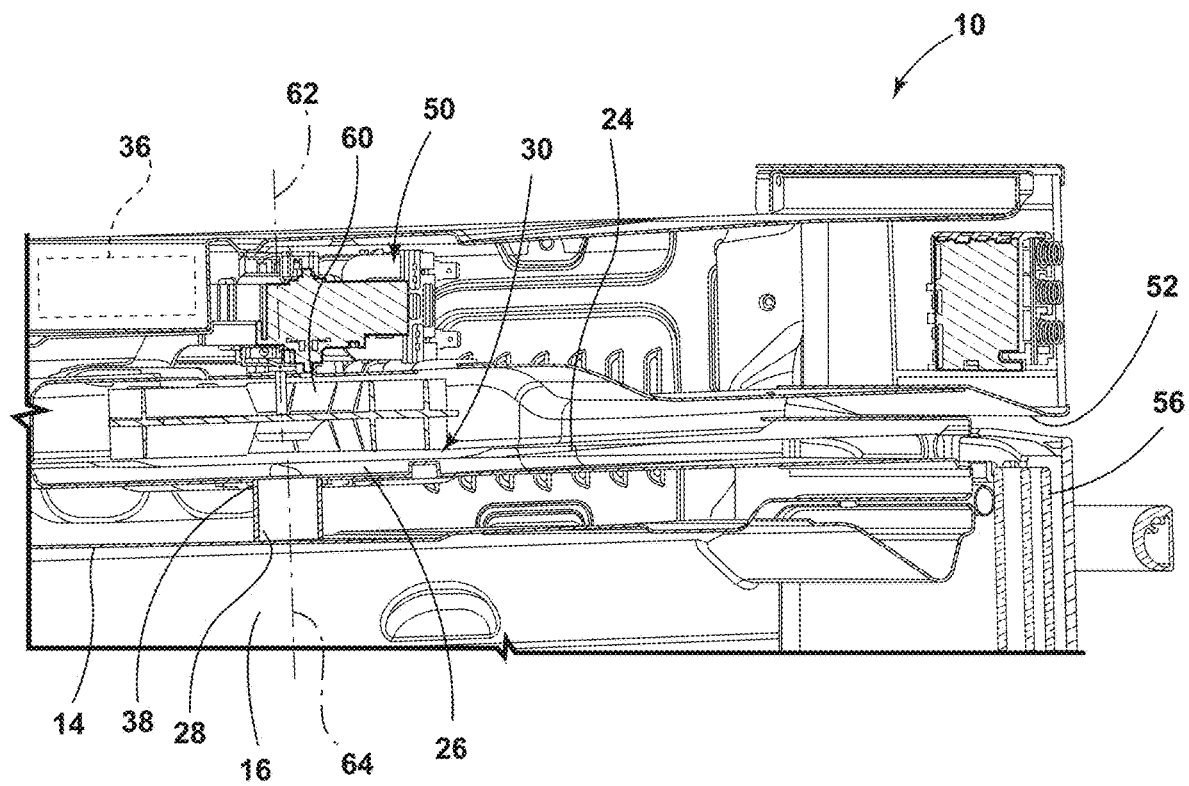
FIG. 2 is a cross-sectional view of a venting assembly in a venting channel of a cooking appliance, according to the present disclosure.

Referring to FIGS. 1 and 2, the cooking appliance 10 includes the body 12 with the internal support 14 disposed within an interior thereof. The cooking appliance 10 is illustrated as an oven, but may be any appliance that includes the cooking cavity 16 such as an oven, a microwave oven, a countertop oven, etc. In non-limiting examples, the cooking appliance 10 is configured to cook food items within the cooking cavity 16 via a steam cook process or a steam assisted cooking process. Steam may be an efficient cooking method. In such examples, the cooking appliance 10 includes the steam generator 42 configured to inject steam into the cooking cavity 16. The steam generator 42 generally includes a reservoir for housing fluid, such as water, and a boiler, which are fluidly coupled with the cooking cavity 16.

The cooking appliance 10 also includes a ventilation system 50 for monitoring and optimizing conditions within the cooking cavity 16 to control the cooking process. In steam cooking examples, different cooking modes generate different levels of humidity within the cooking cavity 16 and different foods often utilize different moisture or humidity levels for the steam cooking process. Excess steam within the cooking cavity 16 can cause condensation, which can affect the cooking process. The steam generator 42 is configured to add steam and humidity into the cooking cavity 16, while the ventilation system 50 releases steam and humidity from the cooking cavity 16. Accordingly, the cooking appliance 10 controls the steam generator 42 and the venting assembly 30 to maintain a select or optimized humidity level within the cooking cavity 16.

In additional or alternative examples, the ventilation system 50 may control condensation within the cooking cavity 16. The condensation may be caused by the food, the steam generator 42, etc. Further, the ventilation system 50 may control heat within the cooking cavity 16. In such examples, the ventilation system 50 may also vent hot air from the cooking cavity 16, which may operate to lower the temperature within the cooking cavity 16. Further, smoke and fumes may be vented from the cooking cavity 16 using the ventilation system 50. The ventilation system 50 operates to control and optimize the conditions within the cooking cavity 16 to control and optimize the cooking process for the food disposed therein.

Referring still to FIGS. 1 and 2, the upper wrapper 22 is generally disposed vertically above the internal support 14. The chimney 28 extends between the internal support 14 and the upper wrapper 22 providing fluid communication between the cooking cavity 16 and the venting channel 26. The chimney 28 is generally a cylindrical barrel that extends from the internal support 14 to the upper wrapper 22, and may also extend partially through the upper wrapper 22. The separator plate 24 is disposed adjacent to the upper wrapper 22 and generally disposed above the upper wrapper 22 to define the venting channel 26 therebetween. The venting channel 26 is in fluid communication with an area external to the cooking appliance 10. In this way, air and other conditions (e.g., moisture, heat, etc.) within the venting channel 26 may be released from the cooking appliance 10 and vented out of the cooking appliance 10.

The cooking appliance 10 includes a gap 52 or a plurality of apertures 52 on a front of the body 12. The gap 52 or apertures 52 are defined above an opening 54 into the cooking cavity 16 and above a door 56 for selectively accessing and closing the cooking cavity 16. The apertures 52 are in fluid communication with the venting channel 26, allowing the air and steam to vent through the front of the cooking appliance 10. It is contemplated that the gap 52 or the apertures 52 may be defined in any practicable location without departing from the teachings herein.

The ventilation system 50 includes a fan 60 disposed proximate to the chimney 28. In certain aspects, a rotational axis 62 of the fan 60 may be aligned with a center axis 64 of the chimney 28 to provide a more efficient airflow through the cooking appliance 10. Alternatively, the rotational axis 62 may be offset from the center axis 64 depending on the location of the chimney 28 and the venting assembly 30. Where additional space may be utilized by the venting assembly 30 extending over the vent opening 38 that may hinder operation of the fan 60 or other internal components, the chimney 28 may be offset from the fan 60. The fan 60 is activated to assist in drawing air, fumes, moisture, etc. from the cooking cavity 16 into the venting channel 26 to be vented outside of the cooking appliance 10.

Figure 3:
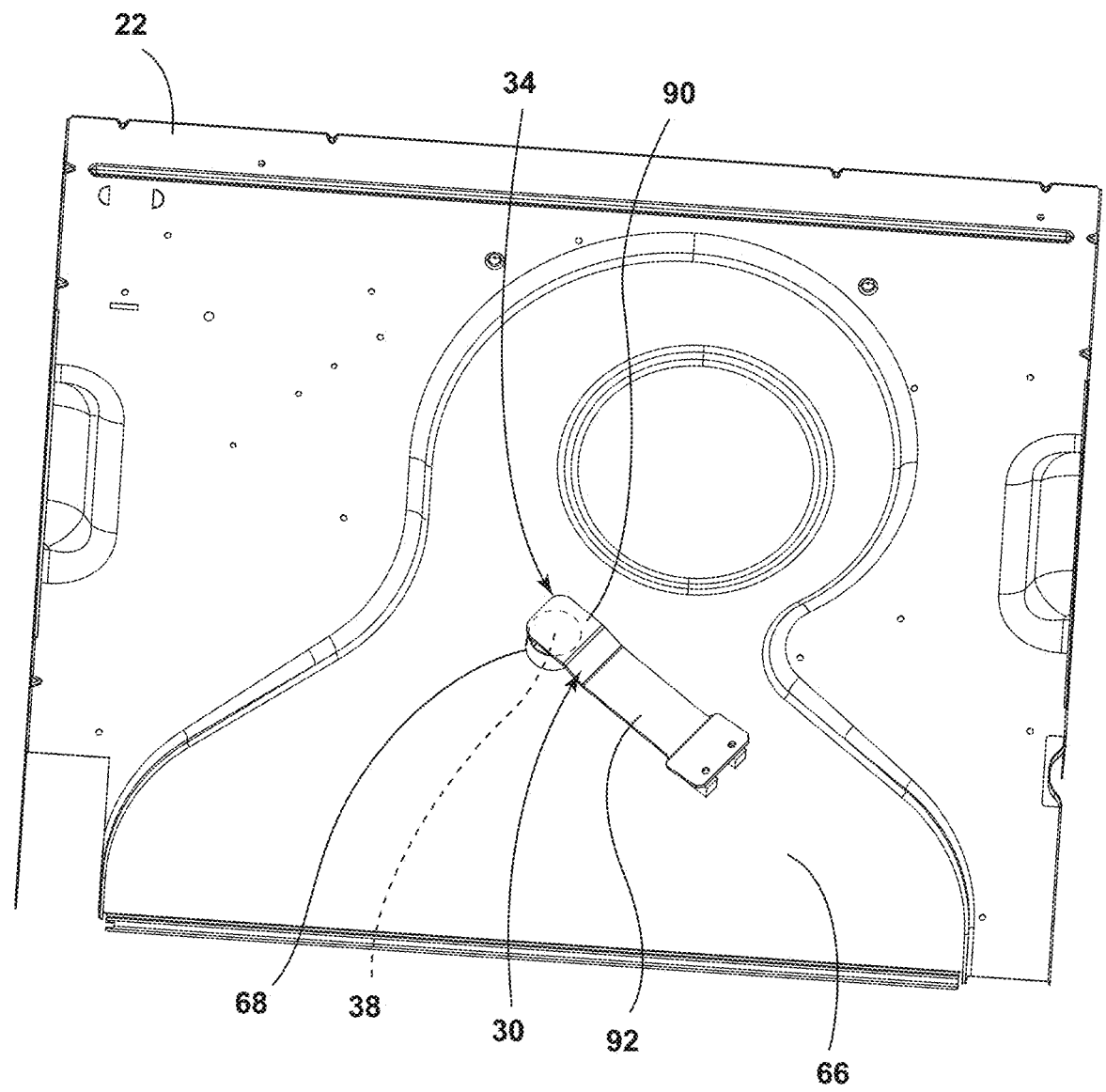
FIG. 3 is a side perspective view of a venting assembly with a cover extending over a vent opening, according to the present disclosure.

Referring now to FIG. 3, the upper wrapper 22 generally extends a similar length, width, and depth as the cooking appliance 10 (FIG. 1) to form a floor or base for the venting channel 26 and to support the venting assembly 30. The upper wrapper 22 defines two embossed regions 66, 68, which assist in defining the venting channel 26 as well as providing space for the venting assembly 30 and other components in the venting channel 26. It is contemplated that the upper wrapper 22 may define a single embossed region 66 without departing from the teachings herein.

For example, as illustrated in FIG. 3, the upper wrapper 22 includes the first embossed region 66, extending along one edge, generally a front edge proximate to the gap 52 or the apertures 52, and toward an opposing edge of the upper wrapper 22. The first embossed region 66 defines the shape for the venting channel 26 allowing the air and steam to be directed through the space defined by the first embossed region 66 and out of the cooking appliance 10.

The second embossed region 68 is defined within the first embossed region 66. In this way, the upper wrapper 22 defines at least three levels. Accordingly, air, fumes, and moisture from the cooking cavity 16 travel through the chimney 28 and through the vent opening 38 to the space defined by one or both of the embossed regions 66, 68 of the upper wrapper 22.

Figure 4:
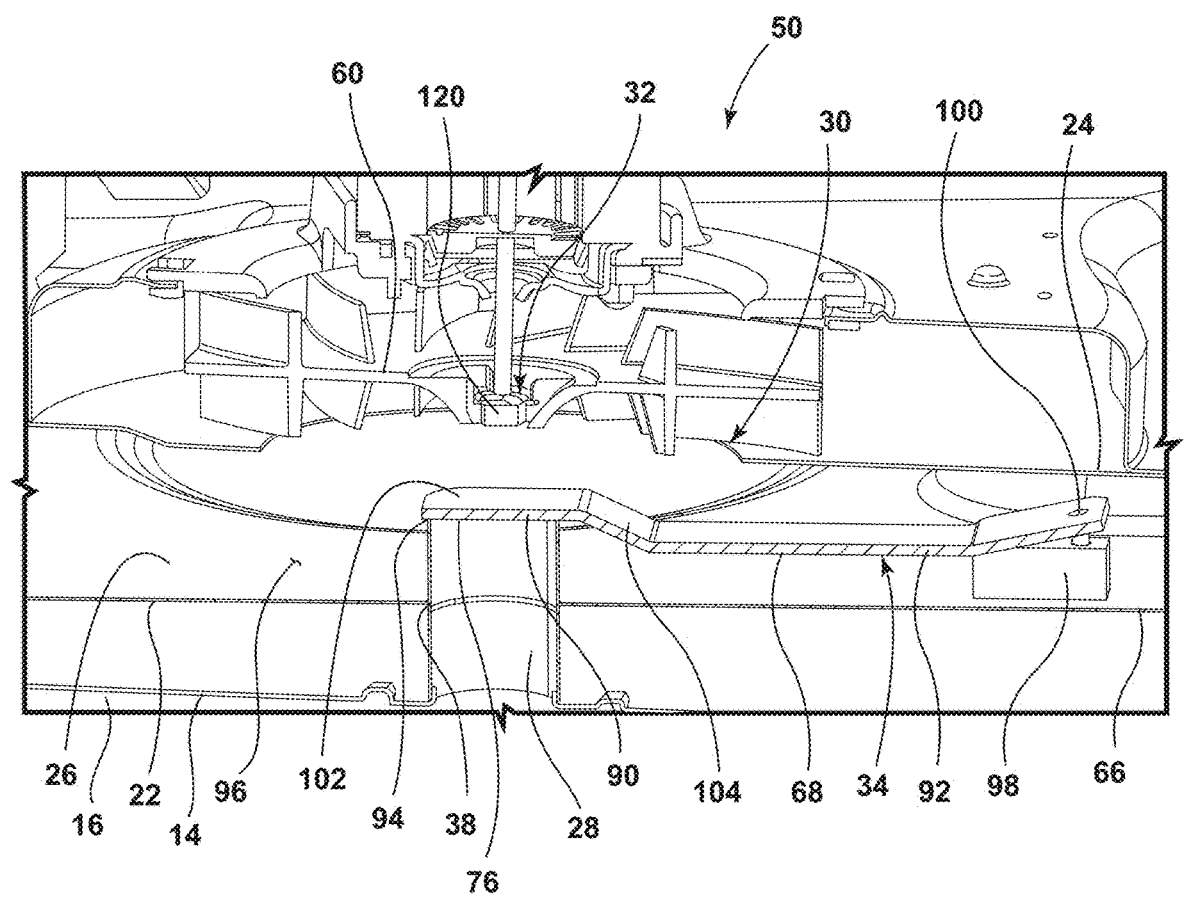
FIG. 4 is a cross-sectional view of a venting assembly in a venting channel of a cooking appliance with a cover in a closed position, according to the present disclosure.
Figure 5:
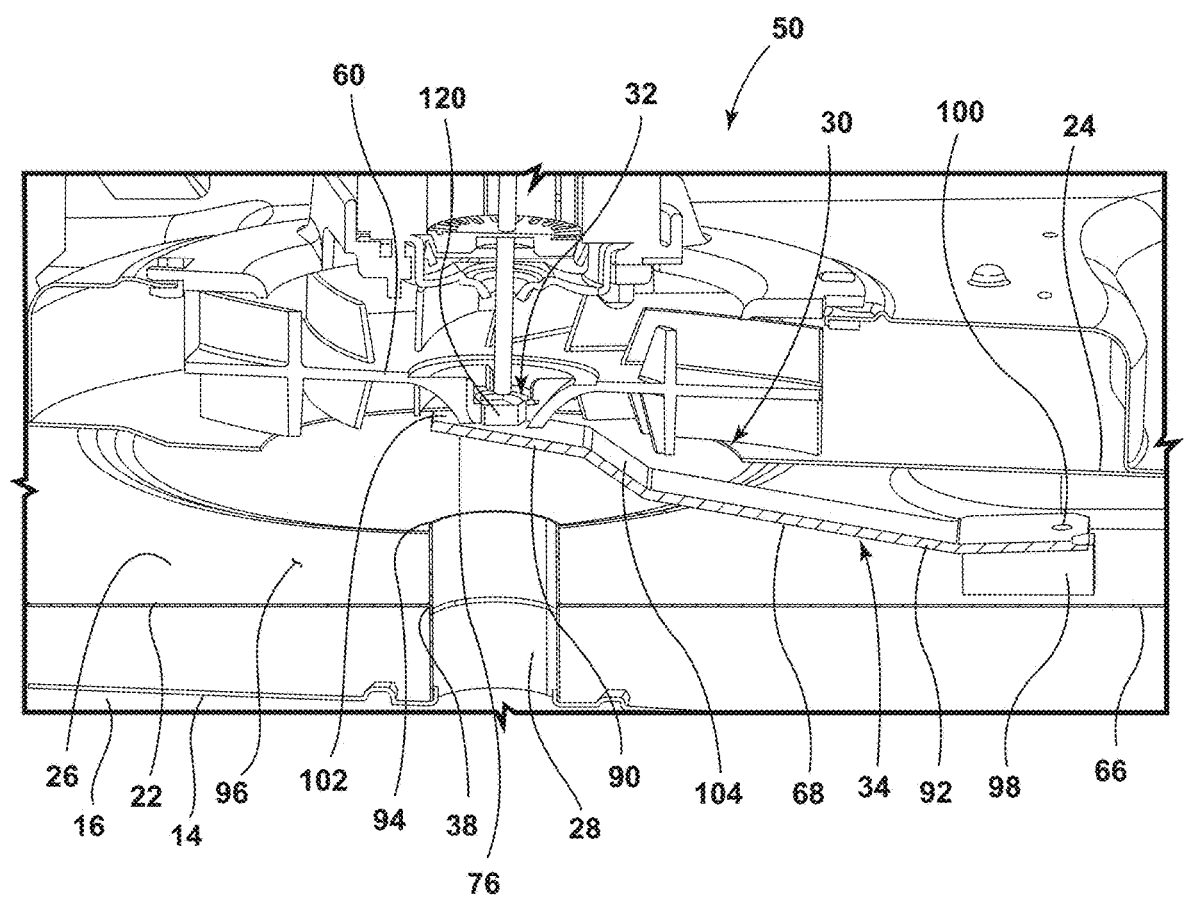
FIG. 5 is a cross-sectional view of a venting assembly in a venting channel of a cooking appliance with a cover in an opened position, according to the present disclosure.

Referring still to FIG. 3, as well as to FIGS. 4 and 5, the venting assembly 30 extends across one or both of the embossed regions 66, 68 depending on the location of the vent opening 38. The embossed regions 66, 68 may provide the additional space for accommodating the venting assembly 30 proximate to the vent opening 38. The venting assembly 30 includes the chimney 28, the actuator 32 and the cover 34. The actuator 32 is configured to move the cover 34 relative to the vent opening 38 and the chimney 28 between an opened position 76, allowing air, fumes, moisture, etc. to flow through the vent opening 38, and a closed position 78, preventing or blocking the air, fumes, moisture, etc. from exiting the cooking cavity 16.

In the example illustrated in FIGS. 4 and 5, the cover 34 of the venting assembly 30 includes a cover plate 90 with a fulcrum arm 92 extending therefrom. The chimney 28 extends through the vent opening 38 with an outlet end 94 being disposed above a surface 96 of the upper wrapper 22. In such configurations, the cover plate 90 is configured to engage or abut the outlet end 94 of the chimney 28 in the closed position 78, which blocks fluid communication through the vent opening 38. The cover plate 90 is configured to move relative to the outlet end 94 and the vent opening 38 to adjust fluid communication between the venting channel 26 and the cooking cavity 16. It is contemplated that the cover plate 90 may engage the surface 96 of the upper wrapper 22 when in the closed position 78, such as the configuration illustrated in FIGS. 6-8 without departing the teachings herein.

A support block 98 or support blocks 98 are coupled to the surface 96 of the upper wrapper 22 within the venting channel 26. The fulcrum arm 92 of the cover 34 is coupled to the support blocks 98. The support blocks 98 are configured to space the cover plate 90 and the fulcrum arm 92 from the upper wrapper 22 to engage the outlet end 94 of the chimney 28. The support blocks 98 may be coupled to the surface 96 in the first embossed region 66 or the second embossed region 68 based on the configuration of the venting channel 26, length of the fulcrum arm 92, and position of the chimney 28 relative to the upper wrapper 22.

An end 100 of the fulcrum arm 92 is fixed to the support blocks 98, forming a fulcrum for the cover 34. Generally, the end 100 of the fulcrum arm 92 is fixed via a fastener or other coupling member. The fulcrum arm 92 extends toward the chimney 28 to the cover plate 90. The cover plate 90 has an engaging portion 102, which is configured to be disposed over the chimney 28, and a connecting portion 104, extending between the engaging portion 102 and the fulcrum arm 92. Generally, the fulcrum arm 92 is offset from the engaging portion 102 by the connecting portion 104. The fulcrum arm 92 is positioned below the outlet end 94, and the connecting portion 104 extends at an angle between the fulcrum arm 92 and the engaging portion 102 so the engaging portion 102 can extend over the chimney 28. When the cover 34 is in the closed position 78, the fulcrum arm 92 generally extends parallel to the surface 96 of the upper wrapper 22, and the engaging portion 102 generally extends parallel to the fulcrum arm 92.

The cover 34, including the cover plate 90 and the fulcrum arm 92, is generally constructed of ferromagnetic materials or any materials that may have magnetic properties. The construction of the cover 34 biases the cover plate 90 toward the closed position 78 such that the closed position 78 is the default state of the venting assembly 30. When in the closed position 78, the cover plate 90 abuts the outlet end 94 of the chimney 28, closing the chimney 28 and preventing fluid communication with the venting channel 26.

Referring still to FIGS. 3-5, the actuator 32 is configured as a solenoid valve 120 disposed proximate to the cover plate 90. The solenoid valve 120 is disposed vertically above the cover plate 90. In certain aspects, where the rotational axis 62 of the fan 60 aligns with the center axis 64 of the chimney 28, the solenoid valve 120 may be coupled to the fan 60 along the rotational axis 62 of the fan 60. The solenoid valve 120 may also be coupled to the separator plate 24 or another component within the cooking appliance 10 proximate to the cover plate 90. The solenoid valve 120 remains in a fixed position relative to the cover plate 90.

The solenoid valve 120 is operable between an activated state and a deactivated state, which adjusts the position of the cover 34. When in the activated state, the solenoid valve 120 is configured to magnetically engage or attract the cover plate 90, vertically moving the cover plate 90 toward the solenoid valve 120, opening the outlet end 94. The cover plate 90 and/or the fulcrum arm 92 may adjust in response to the magnetic engagement with the solenoid valve 120. In various aspects, the fulcrum arm 92 connecting to the support blocks 98 provides the fulcrum for lifting and rotating the cover 34 to the opened position 76. At least a portion of the cover 34 is configured to rotate about a generally horizontal axis to lift and lower between the opened and closed positions 76, 78.

The fulcrum arm 92 and the cover plate 90 may each lift a same distance from the closed position 78, or alternatively, the cover plate 90 may lift a greater distance in response to activation of the solenoid valve 120. The cover 34 is configured to lift and rotate (with a pivot point at the fulcrum) to the opened position 76. The cover plate 90 may be free of the direct engagement with the chimney 28 when in the opened position 76.

It is also contemplated that the fulcrum arm 92 remains in a substantially same position, while the cover plate 90 lifts and rotates relative to the fulcrum arm 92. In such examples, the cover plate 90 may be angled and maintain at least some engagement with the chimney 28. In such examples, at least a portion of the cover plate 90 is rotated by the magnetic engagement of the solenoid valve 120 away from the vent opening 38.

Different configurations of the opened position 76 may be utilized by the cooking appliance 10. For example, a greater rotation of the cover 34 to be free of a direct engagement with the chimney 28 may be utilized in certain conditions, while a lesser degree of rotation of the cover 34 where the cover 34 maintains engagement with the chimney 28 may be used in other conditions. It is also contemplated that for different cooking modes or humidity levels, the magnetic engagement between the solenoid valve 120 and the cover plate 90 may be adjusted to provide different amounts of opening of the chimney 28.

As illustrated in FIG. 5, the cover 34 is configured to rotate and vertically move relative to the vent opening 38 to open and close the vent opening 38. Opening the chimney 28 allows the fluid communication between the cooking cavity 16 and the venting channel 26. When the solenoid valve 120 is adjusted to the deactivated state, there is no longer magnetic engagement or attraction between the solenoid valve 120 and the cover 34. The solenoid valve 120 releases the cover 34. A biasing force of the cover 34 returns the cover plate 90 to abutting the chimney 28 and closing the vent opening 38.

Figure 6:
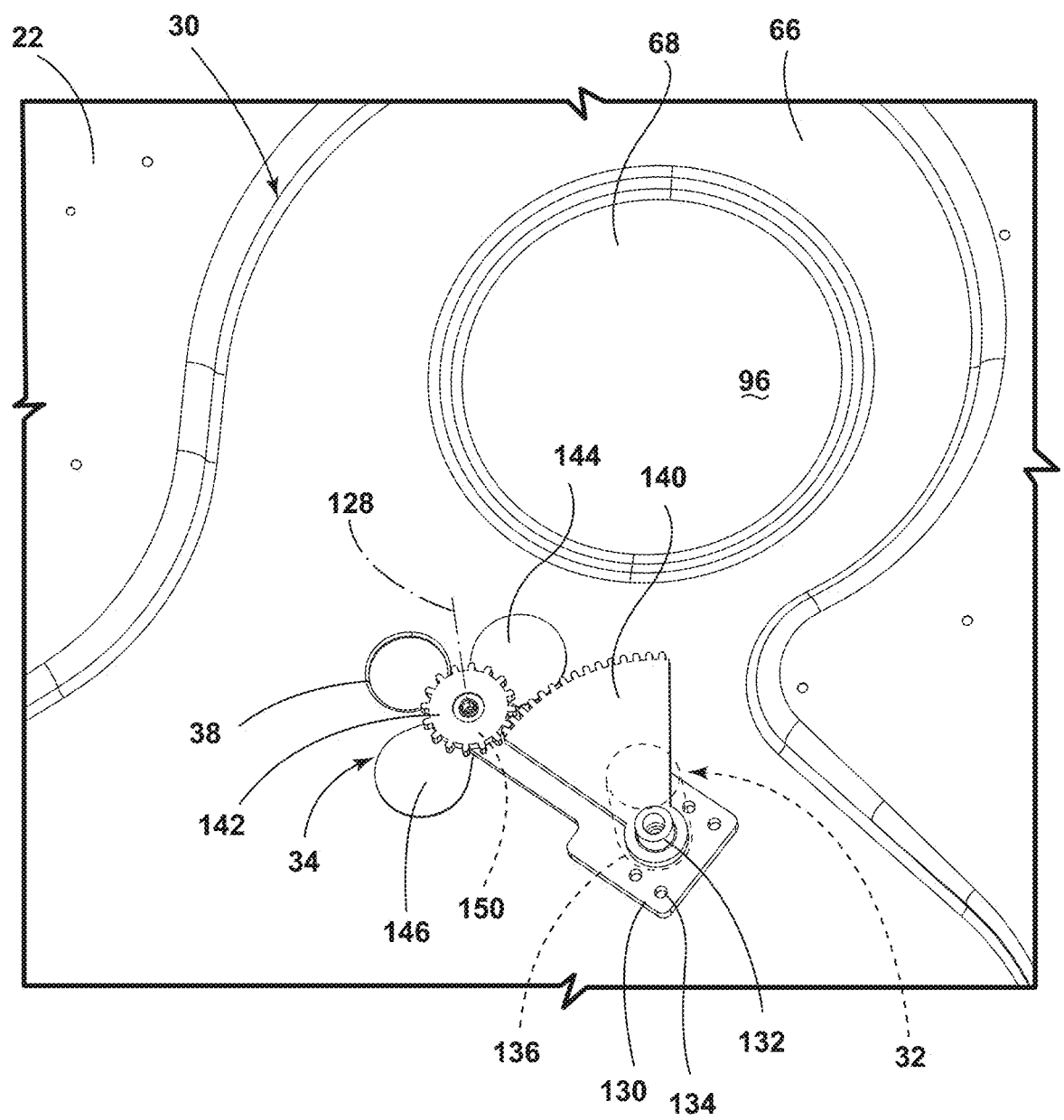
FIG. 6 is a side perspective view of a venting assembly with gears operably coupled to cover plates for closing a vent opening, according to the present disclosure.
Figure 7:
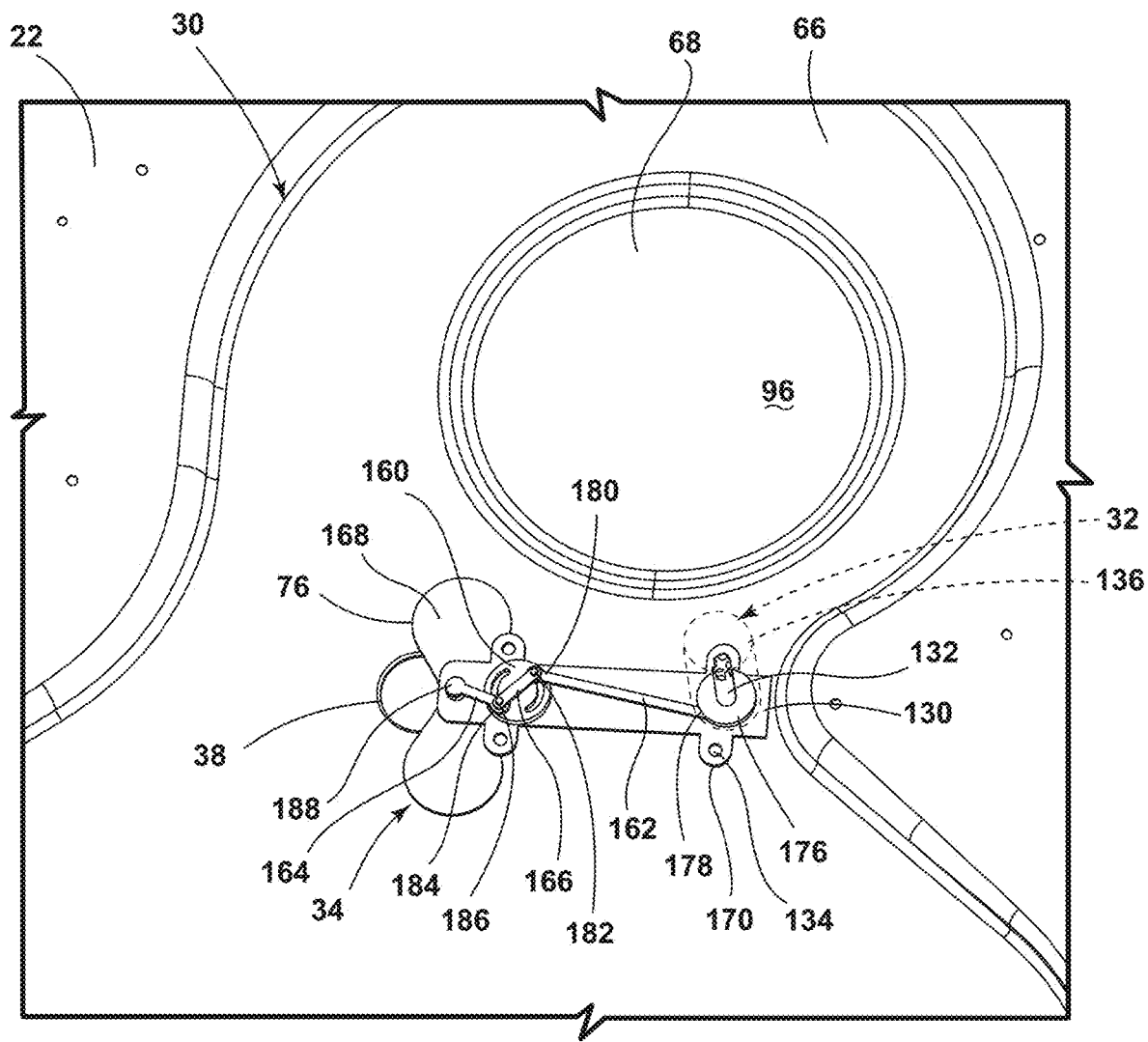
FIG. 7 is a side perspective view of a venting assembly for transferring rotation force from an actuator, through a linkage, a connector, a cam, and a link, to a cover plate, where the cover plate is in an opened position, according to the present disclosure.

Referring to FIGS. 6 and 7, the cover 34 may be configured to be rotated about a vertical axis 128 to open and close the vent opening 38. In such examples, the cover 34 is configured to slide across the surface 96 of the upper wrapper 22 to open and close the vent opening 38. Accordingly, the outlet end 94 of the chimney 28 generally aligns with the vent opening 38, such that the chimney 28 does not extend into the venting channel 26.

In the illustrated configuration of FIG. 6, the venting assembly 30 includes a support plate 130, which is coupled to the upper wrapper 22. Components of the venting assembly 30 are coupled to the support plate 130, which can then subsequently be coupled to the upper wrapper 22. The support plate 130 defines apertures 134 for receiving fasteners to couple the venting assembly 30 to the upper wrapper 22. Additionally, the support plate 130 provides a feature for supporting the venting assembly 30 and providing efficient installation into the cooking appliance 10 (FIG. 1). While the venting assembly 30 is shown with the support plate 130, the components of the venting assembly 30 may be coupled directly to the upper wrapper 22 without departing from the teachings herein.

The actuator 32 is operably coupled with an actuator shaft 132. In various examples, the actuator 32 is configured as a motor 136, which drives rotation of the actuator shaft 132. The actuator shaft 132 is operably coupled with a first gear 140, which is configured as a drive gear, such that rotation of the actuator shaft 132 drives rotation of the first gear 140.

The first gear 140 is operably coupled with a second gear 142, which is configured as a follower gear. The first gear 140 is generally larger than the second gear 142 with the first gear 140 and the second gear 142 having a predefined ratio to transfer the rotational movement through the venting assembly 30. The second gear 142 is coupled to the cover 34, which is configured as two opposing cover plates 144, 146. Rotation of the second gear 142 is configured to drive rotation of the cover plates 144, 146 relative to the vent opening 38.

The cover plates 144, 146 are generally mirror images of one another. The cover plates 144, 146 may be a circular or oblong shape, such as the configuration illustrated in FIG. 5, or may be fan-shaped, such as the configuration illustrated in FIG. 6. The cover plates 144, 146 are generally arranged diametrically opposite one another relative to the second gear 142. This allows one of the cover plates 144 to cover 34 the vent opening 38 in the closed position 78 and both cover plates 144, 146 to be fully removed from the vent opening 38 when in the opened position 76. The cover plates 144, 146 may be any practicable size, shape, and relationship to one another for entirely covering the vent opening 38 in the closed position 78 and being at least substantially removed from the vent opening 38 in the opened position 76. Additionally or alternatively, it is contemplated that a single cover plate 144 may be used in the venting assembly 30 with the gears 140, 142.

In various aspects, the cover plates 144, 146 are disposed below the support plate 130 abutting the surface 96 of the upper wrapper 22, while the gears 140, 142 and the actuator shaft 132 are disposed above the support plate 130. This provides a sliding engagement between the cover plates 144, 146 and the upper wrapper 22. Additionally, this configuration provides a better seal over the vent opening 38.

Additionally, the rotational force from the motor 136 is transferred through various components along the support plate 130 to the cover plates 144, 146. The cover plates 144, 146 are disposed at one end of the support plate 130, while the actuator 32 is disposed proximate an opposing end. The motor 136 drives rotation of the actuator shaft 132, which drives rotation of the first gear 140. The rotation of the first gear 140 in a first direction drives rotation of the second gear 142 in a second direction. The rotation of the second gear 142, consequently, drives rotation of the cover plates 144, 146 relative to the vent opening 38 to selectively cover and uncover the vent opening 38.

As illustrated in FIG. 6, the first gear 140 may be wedge-shaped or fan-shaped. In such examples, the first gear 140 is configured to be rotated in the first direction, which causes rotation of the second gear 142 in the second direction and, consequently, rotation of the cover plates 144, 146 to uncover the vent opening 38. The first gear 140 is then configured to be rotated in the opposing second direction, which causes the rotation of the second gear 142 and the cover plates 144, 146 to cover the vent opening 38. In this way, the first gear 140 is configured to be rotated in two directions (i.e., clockwise and counterclockwise) to adjust the position of the cover plates 144, 146. The rotation of the first gear 140 may drive rotation of the second gear 142 about 90°.

Additionally or alternatively, the wedge-shaped first gear 140 may be large enough to drive a 180° rotation of the second gear 142. In such examples, the first gear 140 may be rotated a predefined degree of rotation to move the first cover plate 144 to uncover the vent opening 38. The first gear 140 may then be rotated a second predefined degree of rotation in the same direction, which is greater than the first predefined degree of rotation, to cover 34 the vent opening 38 with the second cover plate 146.

To rotate to the initial position, the first gear 140 may rotate the first predefined degree of rotation in the opposite direction to remove the second cover plate 146 from the vent opening 38. The first gear 140 may then rotate the second predefined degree of rotation (e.g., to an initial position), which causes rotation of the cover plates 144, 146 to again cover the vent opening 38 with the first cover plate 144. With the two cover plates 144, 146, the cover plates 144, 146 may alternate between which of the cover plates 144, 146 is disposed over the vent opening 38.

Alternatively, the first cover plate 144 may be the primary cover plate 144, and the secondary cover plate 146 may be utilized in select circumstances, such as for timing, wear on the first cover plate 144, etc. In such examples, the first gear 140 drives clockwise and counterclockwise rotation of the second gear 142, and consequently, the cover plates 144, 146 to primarily cover and uncover the vent opening 38 with the first cover plate 144. When the first cover plate 144 is disposed over the vent opening 38, the second cover plate 146 may be disposed below the support plate 130.

Referring still to FIG. 6, the cover plates 144, 146 may be separate components coupled to the second gear 142. Alternatively, the cover plates 144, 146 may be a single component with a coupling portion 150 disposed between the two cover plates 144, 146. The second gear 142 may be coupled to the second gear 142 to transfer rotation to the cover plates 144, 146.

Figure 8:
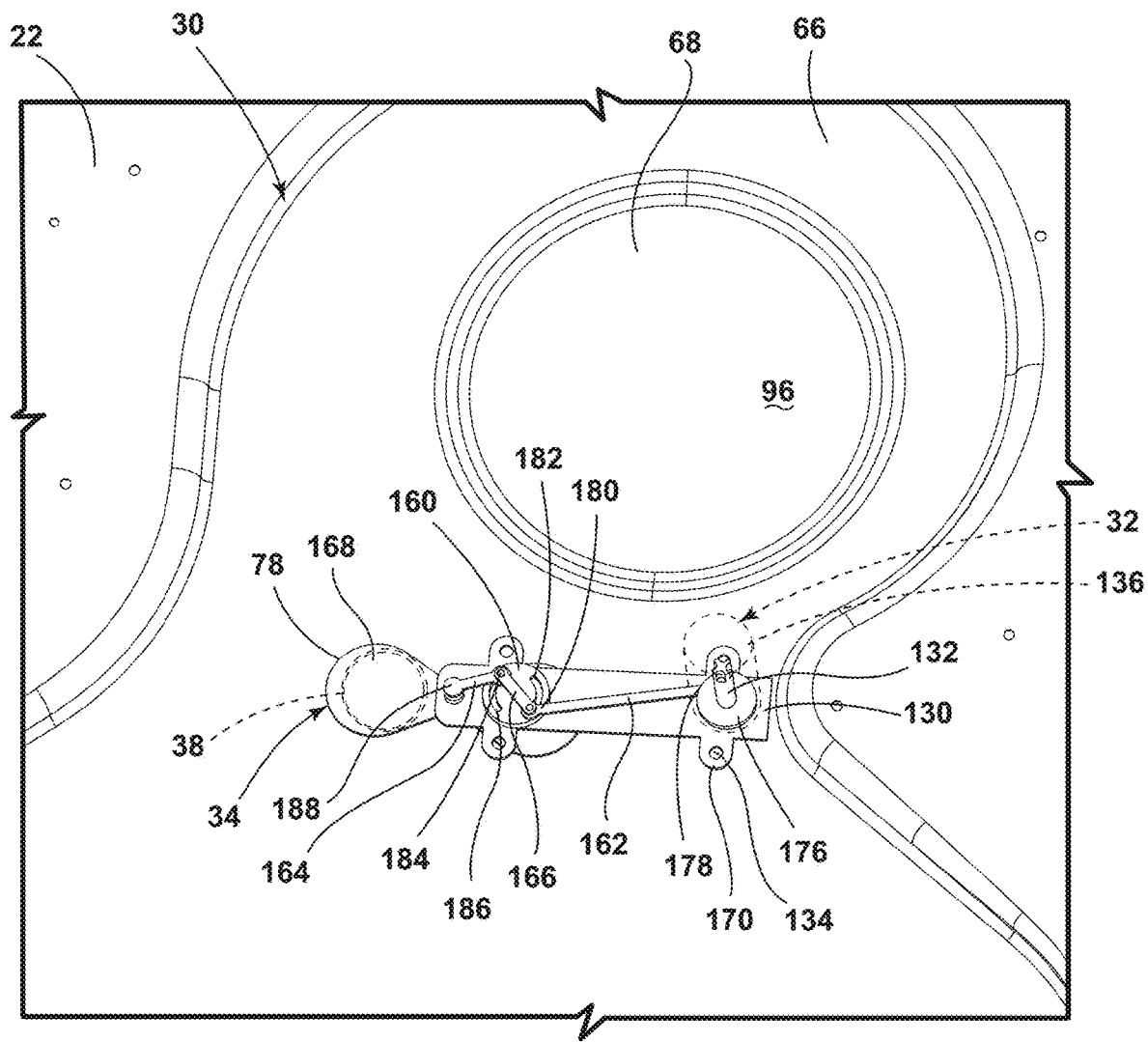
FIG. 8 is a side perspective view of the venting assembly of FIG. 7 with the cover plate in a closed position, according to the present disclosure.

Referring to FIGS. 7 and 8, as the rotational movement of the actuator shaft 132 is transferred through the venting assembly 30, the movement of various components may be guided by a cam 160. The venting assembly 30 includes a linkage 162, a link 164, and a connector 166 to transfer the rotational movement from the actuator 32 to the cover 34. The actuator 32 is configured as the motor 136, and the cover 34 is configured as a sliding cover plate 168. The rotation of the cover 34 between the opened and closed positions 76, 78 is driven by the rotation of the actuator shaft 132 with the movement guided by the cam 160.

The support plate 130 is an elongate plate with flanges 170 defining the apertures 134 configured to receive the fasteners. The actuator shaft 132 is disposed at one end of the support plate 130, and the cover plate 168 is disposed at the opposing end of the support plate 130. Further, the cover plate 168 is disposed proximate a lower surface of the support plate 130 abutting the surface 96 of the upper wrapper 22, and the other components of the venting assembly 30 are disposed above or on the support plate 130. This closer engagement between the cover plate 168 and the upper wrapper 22 provides a better seal over the vent opening 38 when the cover plate 168 is in the closed position 78.

A disc 176 is coupled to the actuator shaft 132. The disc 176 may be a separate component or integrally formed with the actuator shaft 132. Rotation of the actuator shaft 132 drives rotation of the disc 176. A first end 178 of the linkage 162 is coupled to the disc 176. Accordingly, rotation of the disc 176 causes rotation of the linkage 162. In various aspects, the rotation of the linkage 162 is caused by an arcuate movement path of the first end 178 of the linkage 162. Based on the size of the disc 176 and the location where the first end 178 of the linkage 162 is coupled to the disc 176, the first end 178 is moved along the arcuate path as the disc 176 is rotated.

The first end 178 of the linkage 162 is configured to be rotated or moved in a first direction, which causes an opposing second end 180 of the linkage 162 to be rotated or moved in a second direction. The second end 180 of the linkage 162 engages a first groove 182 of the cam 160. The first groove 182 defines an arcuate path, and the second end 180 of the linkage 162 is configured to travel along an arcuate path of the first groove 182 in response to the movement of the first end 178 by the disc 176.

The second end 180 of the linkage 162 is coupled to the connector 166, which extends across the cam 160 to engage the link 164. A first end 184 of the link 164 is configured to move along a second arcuate path defined by a second groove 186 of the cam 160. The second groove 186 is a mirror image of the first groove 182. The first end 184 of the link 164 is configured to travel along the arcuate path of the second groove 186 in response to movement of the linkage 162 based on the engagement via the connector 166.

Referring still to FIGS. 7 and 8, the second end 180 of the connector 166 and the first end 184 of the link 164 are configured to move in opposing directions. Accordingly, the first end 184 of the link 164 and the first end 178 of the linkage 162 are configured to be rotated or moved in the same direction.

Movement or rotation of the first end 184 of the link 164 drives rotation of a second end 188 of the link 164. The second end 188 does not move along an arcuate path, but rotates about a single point, which is where the second end 188 of the link 164 engages the cover plate 168. The rotation of the second end 188 of the link 164, consequently, drives rotation of the cover plate 168.

In the configuration illustrated in FIGS. 7 and 8, the actuator 32 is configured to drive rotation of the actuator shaft 132, which rotates the disc 176. The rotation of the disc 176 drives, rotates, or moves the first end 178 of the linkage 162 in the first direction along the arcuate movement path. The movement of the first end 178 of the linkage 162 causes the rotation or movement of the second end 180 of the linkage 162 along the first groove 182 of the cam 160. The movement of the second end 180 of the linkage 162 causes the first end 184 of the link 164 to be rotated or moved along the second groove 186 of the cam 160 through the engagement via the connector 166. The movement of the first end 184 of the link 164 is configured to drive rotation of the second end 188 of the link 164 to, consequently, drive rotation of the cover plate 168 between the opened and closed positions 76, 78. Accordingly, the rotational force of the actuator 32 is transferred via multiple components across the support plate 130 to the cover plate 168. The cover plate 168 is illustrated as a single, fan-shaped plate. The cover plate 168 may have any practicable configuration for fully covering and uncovering the vent opening 38.

The disc 176 is rotated by the actuator shaft 132 in both the clockwise and counterclockwise directions to move the cover plate 168 between the opened and closed positions 76, 78. The actuator 32 is configured to rotate the actuator shaft 132 a predefined degree of rotation in a first direction to move the cover plate 168 to the opened position 76 and the predefined angle of rotation in the second opposing direction to return the cover plate 168 to the closed position 78. The actuator shaft 132 may not be configured to rotate 360° due to the engagement between the disc 176 and the linkage 162, as well as the configuration of grooves 182, 186 of the cam 160.

Referring still to FIGS. 7 and 8, the venting assembly 30 may include a single cover plate 168. In such examples, the cover plate 168 is in the opened position 76 when the linkage 162 and the link 164 are at first ends of the first and second grooves 182, 186 and in the closed position 78 when the linkage 162 and link 164 are at second opposing ends of the first and second grooves 182, 186. Alternatively, the venting assembly 30 may include two cover plates 168. In such examples, when the linkage 162 and the link 164 are at the first ends of the first and second grooves 182, 186, the first cover plate 168 is disposed over the vent opening 38. When the linkage 162 and link 164 are at second opposing ends of the first and second grooves 182, 186, the second cover plate 168 is disposed over the vent opening 38. When the linkage 162 and link 164 are between the ends of the grooves 182, 186, the cover plates 168 are in the opened position 76. The cover plate 168 is coupled to the link 164. The link 164 may extend at least partially through the support plate 130 to engage the cover plates 168. The coupling portion 150 may also extend at least partially through the support plate 130 to engage the link 164.

Referring to FIGS. 3-8, the ventilation system 50 includes the fan 60, the controller 36, and the venting assembly 30. The controller 36 may be a central control unit for the cooking appliance 10 (FIG. 1), or a designated controller 36 for venting operations and condition management in the cooking cavity 16. The controller 36 is communicatively coupled to the fan 60 and the venting assembly 30 and is configured to activate the fan 60 and/or the venting assembly 30 to manage and control the conditions within the cooking cavity 16. In operation, a default state of the venting assembly 30 is with the cover 34 in the closed position 78. In the default state, the cooking cavity 16 is not in fluid communication with the venting channel 26.

The controller 36 is configured to activate the actuator 32 to rotate and/or lift the cover 34 to open the chimney 28 and provide the fluid communication between the cooking cavity 16 and the venting channel 26. With the cover 34 in the opened position 76, air, fumes, moisture, etc. are drawn from the cooking cavity 16, through the chimney 28, and into the venting channel 26 to be vented out of the cooking appliance 10 (FIG. 1). The controller 36 is then configured to reactivate the actuator 32 (i.e., the motor 136) or deactivate the actuator 32 (i.e., the solenoid valve 120) to return the cover 34 to the closed position 78, maintaining the conditions in the cooking cavity 16.

Figure 9:
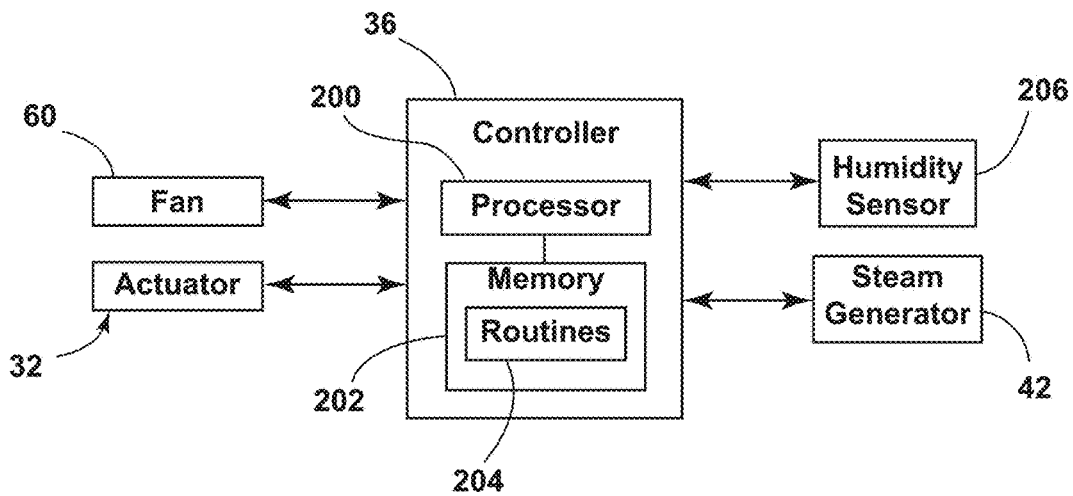
FIG. 9 is a block diagram of a ventilation system for a cooking appliance, according to the present disclosure.
Figure 10:
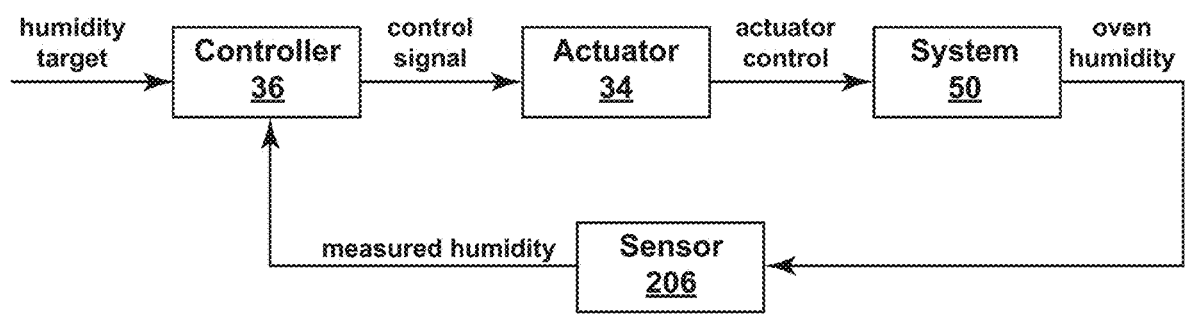
FIG. 10 is a block diagram of a ventilation system for a cooking appliance showing inputs and outputs, according to the present disclosure.

Referring to FIGS. 9 and 10, the controller 36 includes a processor 200, a memory 202, and other control circuitry. Instructions or routines 204 are stored within the memory 202 and executable by the processor 200. The controller 36 may include various types of control circuitry, digital or analog, and may include the processor 200, a microcontroller, an application-specific circuit (ASIC), or other circuitry configured to perform the various input and output, control, analysis, or other functions described herein. The memory 202 may be implemented in a variety of volatile and nonvolatile memory formats. The routines 204 include operating instructions to enable various methods and functions described herein. Moreover, the control circuitry may be communication circuitry configured for wireless and wired bidirectional or multidirectional communication.

The controller 36 is configured to store a variety of information about cooking programs and settings. In a non-limiting example where the cooking appliance 10 includes a steam cooking feature, the controller 36 may be configured to store steam and/or humidity levels utilized for cooking programs, types of food, changes in steam throughout a cooking process, etc. A humidity level for a selected cooking program (e.g., time, food type, etc.) may differ based on the cooking program. The controller 36 is configured to store the predefined humidity level (e.g., a humidity target) for various cooking programs.

Further, the controller 36 may be configured to receive a user input related to the conditions in the cooking cavity. For example, the user may select a high steam function, which is generally a 75% of a maximum humidity level, a mid-steam level, which is about 50% of the maximum steam level, and a low steam level, which is about 25% of the maximum steam level. The three humidity levels may be overall levels or may be an adjustment to a cooking program (e.g., high, medium, or low based on a relative adjustment from the stored humidity level). In other non-limiting examples, the user input may relate to a type of food, which may produce increased moisture or fumes, which affects the operation of the venting assembly 30. Further, the user input may relate to heat levels, such as for searing, browning, or otherwise cooking the food. The heat level may vary throughout the cooking process, and the controller 36 may activate the venting assembly 30 to control the temperature within the cooking cavity 16.

In a specific non-limiting example, the controller 36 is configured to utilize the venting assembly 30 to manage humidity within the cooking cavity 16. The cooking appliance 10 includes a humidity sensor 206 operably coupled with the cooking cavity 16 and configured to sense a humidity level within the cooking cavity 16. The sensed humidity is communicated by the humidity sensor 206 to the controller 36, and the controller 36 is configured to monitor the sensed humidity level. Additionally, the controller 36 is configured to compare the sensed humidity level with the predefined humidity level for the cooking program and/or based on the user selection. If the sensed humidity level is below the predefined humidity level, the controller 36 is configured to activate the steam generator 42 to inject additional steam into the cooking cavity 16. If the sensed humidity level is above the predefined humidity level, the controller 36 is configured to activate the venting assembly 30 to adjust the cover 34 to the opened position 76 and allow the steam to be vented out of the cooking cavity 16.

The humidity sensor 206 is configured to continually sense the humidity level within the cooking cavity 16 and communicate the humidity information to the controller 36. When the sensed humidity level reaches the predefined level or drops below the predefined level, the controller 36 is configured to adjust the cover 34 to the closed position 78. The controller 36 may be configured to activate or deactivate the venting assembly 30 to cover 34 and uncover the vent opening 38 and/or the chimney 28 any practicable number of times to maintain the predefined humidity level within the cooking cavity 16 during the cooking process.

With reference to FIGS. 1-10, the controller 36 is configured to control conditions within the cooking appliance 10, including heat, moisture, fumes, etc. In certain aspects, the controller 36 is configured to control the steam generator 42 and the ventilation system 50 to manage and control humidity within the cooking cavity 16. The venting assembly 30 provides more precise and efficient release of steam and other conditions from the cooking cavity 16. Further, use of the venting assembly 30 allows continual opening and closing of the vent opening 38 and chimney 28, which reduces heat loss and provides more precise heat control during the cooking process. The ventilation system 50 reduces condensation buildup in the cooking cavity 16, while providing adjustment for humidity in the cooking cavity 16 for different cooking modes and moisture levels based on food type. Moreover, the venting assembly 30 is generally positioned toward a rear of the cooking appliance 10. The configuration and components of the venting assembly 30 provide more flexibility in the location of the venting assembly 30 within the cooking appliance 10.

Figure 11:
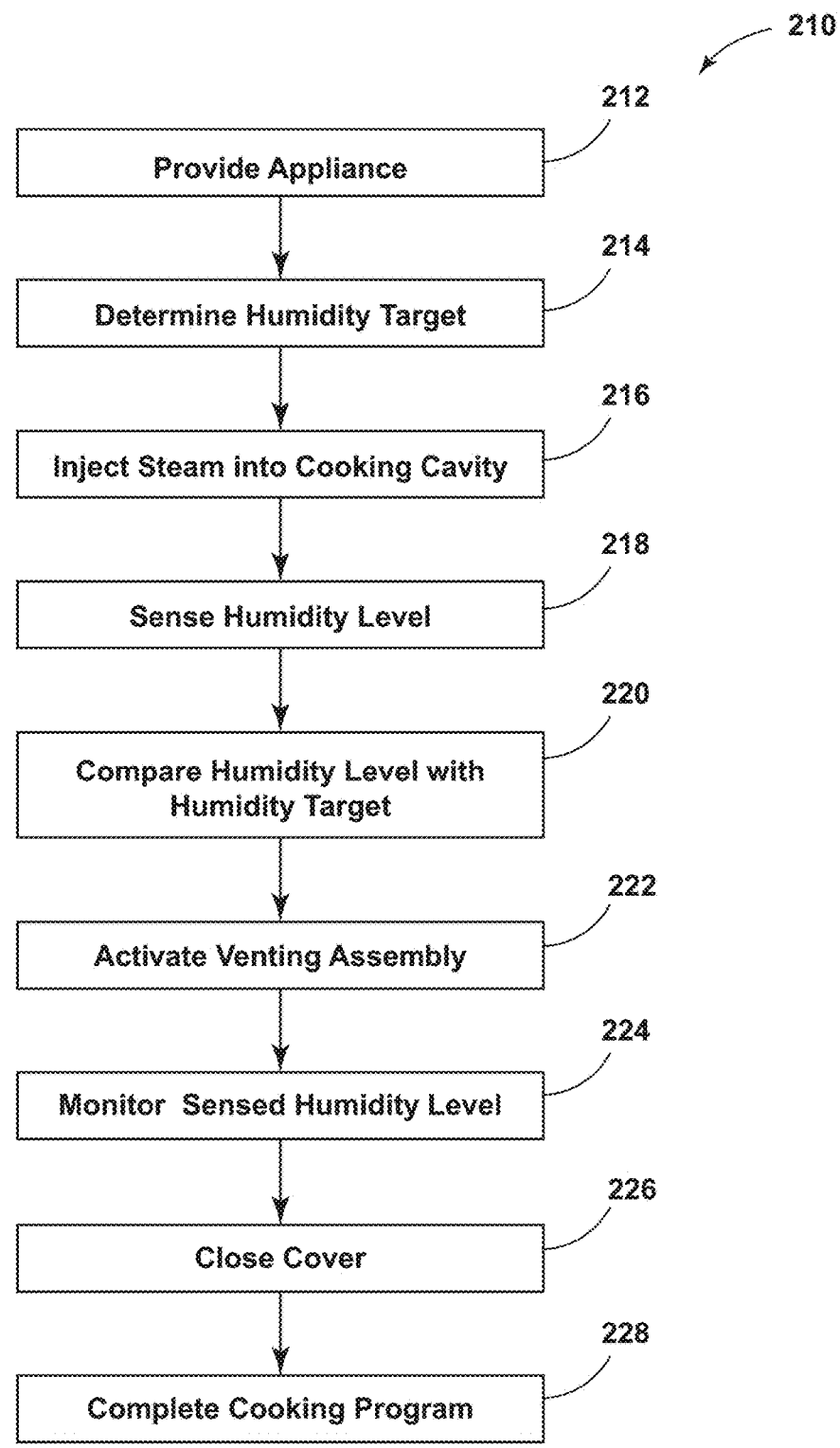
FIG. 11 is a flow diagram of a method of controlling humidity within a cooking cavity, according to the present disclosure.

Referring to FIG. 11, and with further reference to FIGS. 1-10, a method 210 of controlling humidity within the cooking cavity 16 includes step 212 of providing the cooking appliance 10 having the steam generator 42 and the venting assembly 30. In step 214, the predefined humidity level is determined. The controller 36 is configured to determine the predefined humidity level based on various inputs, such as the cooking program type of food to be cooked, user preferences, etc. The predefined humidity level may be a stored value, a user selected value, or based on a stored value with an adjustment for user selection or preference.

In step 216, the steam generator 42 is configured to inject steam into the cooking cavity 16. The controller 36 activates the steam generator 42 to begin the steam cooking process. The amount of steam injected into the cooking cavity 16 is configured to increase the humidity level to the predefined level determined in step 214. In step 218, the humidity sensor 206 is configured to sense the humidity level within the cooking cavity 16. The sensed humidity level is configured to be communicated to the controller 36.

In step 220, the controller 36 is configured to monitor the sensed humidity level. Additionally, the controller 36 is configured to compare the sensed humidity level with the target humidity or predefined humidity level. In step 222, the controller 36 is configured to control the venting assembly 30 based on the sensed humidity level. The controller 36 is configured to maintain the venting assembly 30 in a deactivated state with the cover 34 in the closed position 78 when the sensed humidity level is below or at the predefined humidity level. The controller 36 is configured to activate the venting assembly 30 to control the humidity level in the cooking cavity 16 by opening the vent opening 38 as the sensed humidity level exceeds the predefined humidity level. Accordingly, the cover 34 is configured to be rotated and/or lifted to open the chimney 28 and/or the venting assembly 30 to allow steam to be vented through the venting channel 26.

In step 224, the humidity sensor 206 is configured to continue to sense the humidity level within the cooking cavity 16 and communicate the sensed humidity level to the controller 36. Also, in step 224, the controller 36 is configured to monitor the sensed humidity level compared to the predefined humidity level. In step 226, the controller 36 is configured to adjust the venting assembly 30 to close the cover 34 when the sensed humidity level returns to or below the predefined humidity level, maintaining the steam within the cooking cavity 16. In step 228, the cooking program is completed while maintaining the target humidity level within the cooking cavity 16. It is contemplated that the steps 212-228 of the method 210 may be come completed in any order, simultaneously, repeated, or omitted without departing from the teachings herein.

Figure 12:
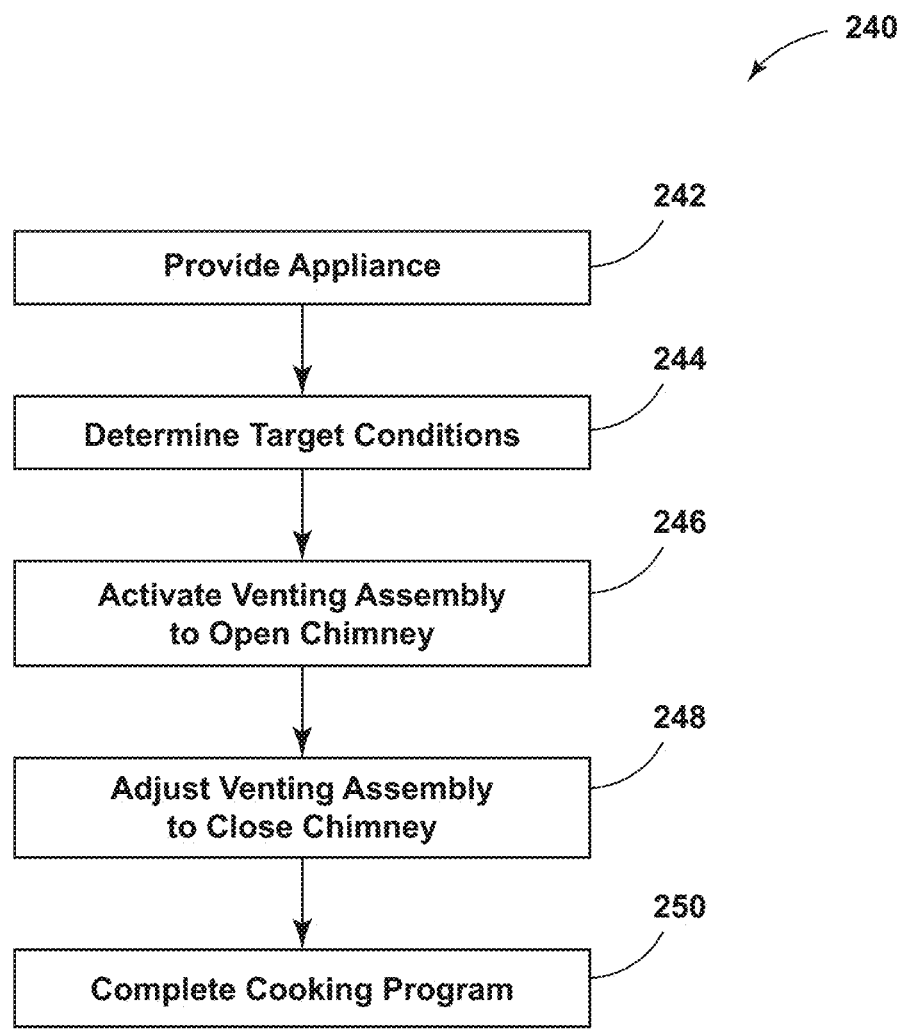
FIG. 12 is a flow diagram of a method of controlling conditions within a cooking cavity, according to the present disclosure.

With reference to FIG. 12, as well as FIGS. 1-11, a method 240 of controlling conditions within the cooking cavity 16 includes step 242 of providing the cooking appliance 10. The cooking appliance 10 may or may not include the steam generator 42 and/or the humidity sensor 206. In step 244, target conditions for the cooking process are determined. In certain aspects, the conditions are determined based on a cooking program, the user-input, or both. The conditions may relate to any aspect within the cooking cavity 16, including, but not limited to, humidity, condensation, heat, and fumes. The condition levels may be specific for a type of food, a type of cooking process, user preferences etc.

In step 246, the controller 36 is configured to activate the venting assembly 30. The controller 36 may be configured to activate the venting assembly 30 in response to a sensed condition and/or based on a predefined criteria (e.g., time, stage of cooking process, etc.). The cover 34 is configured to be rotated and/or lifted to open the chimney 28 and/or the venting assembly 30 to fluidly couple the venting channel 26 with the cooking cavity 16. The cover 34 may remain open until a predefined condition is sensed or the predefined criteria is satisfied (e.g., time elapsed).

In step 248, the controller 36 is configured to adjust the venting assembly 30 to close the cover 34, preventing the fluid communication between the venting channel 26 and the cooking cavity 16. That may allow certain conditions to be increased or maintained within the cooking cavity 16. In step 250, the cooking program is completed while maintaining the target conditions within the cooking cavity 16. It is contemplated that the steps 242-250 of the method 240 may become completed in any order, simultaneously, repeated, or omitted without departing from the teachings herein. Moreover, the method 210 and the method 240 may be performed in sequence, concurrently, etc.

Use of the present device may provide a variety of advantages. For example, the ventilation system 50 is configured to monitor and maintain the humidity level and other conditions within the cooking cavity 16. Additionally, the steam generator 42 may inject steam to use for steam cooking and the humidity level may be maintained automatically through activation of the venting assembly 30 to vent the steam. Further, the venting assembly 30 is configured to be activated to move the cover 34 away from the vent opening 38 and allow the venting of the steam. Moreover, the venting assembly 30 may have an initial or default state in the closed position 78. Further, the activation of the actuator 32 is configured to rotate and/or lift the cover 34 to adjust the cover 34 to the opened position 76 and rotate and/or lower the cover 34 to the closed position 78. Also, in certain aspects, rotation from the actuator 32 is driven through multiple components and transferred to the cover 34. Additional benefits or advantages may be realized and/or achieved.

The device disclosed herein is further summarized in the following paragraphs and is further characterized by combinations of any and all of the various aspects described therein.

According to another aspect of the present disclosure, a cooking appliance includes an internal support defining a cooking cavity. An upper wrapper is disposed above the internal support. A venting assembly is coupled to the upper wrapper. The venting assembly includes a chimney, an actuator, and a cover. The chimney is coupled to the internal support and the upper wrapper. The chimney fluidly couples the cooking cavity and a venting channel. The cover is operably coupled to the actuator. A controller is configured to activate the actuator to at least one of vertically and rotationally adjust the cover relative to the chimney.

According to another aspect, a fan is disposed to the chimney. A controller is configured to activate the fan I.

According to another aspect, an actuator shaft is coupled to an actuator. A first gear is coupled to the actuator shaft. A second gear is operably coupled to the first gear and a cover. Rotation of the actuator shaft by the actuator causes rotation of the first gear and, consequently, rotation of the second gear to rotate the cover relative to a chimney.

According to another aspect, a cover includes a first cover plate and a second cover plate coupled to a second gear.

According to another aspect, a venting assembly includes a disc coupled to an actuator shaft. The actuator shaft is configured to be rotated by an actuator. A linkage is coupled to the disc. A link is coupled to the cover. The linkage is coupled to the link via a connector and a cam.

According to another aspect, rotation of a disc by an actuator shaft causes rotation of a linkage along a first groove of a cam in a first direction, which, consequently, causes rotation of a link along a second groove of the cam in a second direction to rotate a cover relative to a vent opening.

According to another aspect, an actuator is a solenoid valve disposed above a cover. The cover is configured to move vertically away from a chimney to an opened position when the solenoid valve is in an activated state.

According to another aspect, a cover includes a cover plate disposed over a chimney and an fulcrum arm extending from the cover plate. The fulcrum arm is fixed to a separator plate to define a fulcrum.

According to another aspect, a ventilation system for a cooking appliance includes an internal support defining a cooking cavity. An upper wrapper is disposed proximate to the internal support. The upper wrapper at least partially defines a venting channel. A venting assembly is coupled to the upper wrapper. The venting assembly includes a chimney in fluid communication with the venting channel via the vent opening. The venting channel is in fluid communication with the cooking cavity vis the vent opening and the chimney. The venting assembly also includes an actuator, an actuator shaft operably coupled to the actuator, and a cover operably coupled to the actuator shaft. The actuator is configured to drive rotation of the actuator shaft, which, consequently, causes rotation of the cover relative to the vent opening to open and close the vent opening. A controller is communicatively coupled with the venting assembly. The controller is configured to activate the venting assembly to open the vent opening.

According to another aspect, a venting assembly includes a support plate. An actuator shaft and a cover are coupled to opposing ends of the support plate.

According to another aspect, a cavity cover is disposed between a surface of an upper wrapper and a support plate.

According to another aspect, a venting assembly includes a first gear coupled to an actuator shaft. A second gear is operably coupled to the first gear and a cover. An actuator is configured to drive rotation of the actuator shaft to rotate the first gear, which causes rotation of the second gear, and wherein the rotation of the second gear drives rotation of the cover relative to a vent opening.

According to another aspect, a cover includes first and second cover plates. An actuator is configured to rotate the first and second cover plates 180°.

According to another aspect, a venting assembly includes a linkage operably coupled to an actuator shaft. A cam defines a first groove and a second groove. A link is coupled to the linkage via a connector. Rotation of the actuator shaft causes rotation of the linkage along the cam. The rotation of the linkage causes rotation of a link along via the connector. The rotation of the link causes rotation of a cover relative to a vent opening.

According to another aspect, an actuator is configured to drive rotation of a linkage along a first groove in a first direction, wherein the rotation of the linkage in the first direction causes rotation of the link along the second groove in a second direction.

According to another aspect, a venting assembly includes a disc coupled to an actuator shaft. A linkage is coupled to the disc.

According to yet another aspect, a ventilation system for a cooking appliance includes an internal support defining a cooking cavity. An upper wrapper is disposed proximate to the internal support. The upper wrapper at least partially defines a venting channel in fluid communication with the cooking cavity via a vent opening defined in the upper wrapper and a chimney. A venting assembly is coupled to the upper wrapper. The venting assembly includes a solenoid valve operable between an activated state and a deactivated state. A cover is disposed proximate to the solenoid valve and the vent opening. A controller is communicatively coupled to the venting assembly, wherein the controller is configured to adjust the solenoid valve to the activated state to vertically move the cover relative to the vent opening to open the vent opening.

According to another aspect, a cover includes a cover plate disposed over a vent opening and a fulcrum arm extending from the cover plate. The fulcrum arm is coupled to the upper wrapper.

According to another aspect, a cover plate is biased toward a closed position relative to a vent opening by an fulcrum arm.

According to another aspect, a chimney extends through an upper wrapper. A cover is configured to abut an outlet end of the chimney when in a closed position. The cover is spaced from the upper wrapper.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   an internal support defining a cooking cavity;
   an upper wrapper disposed above the internal support;
   a venting assembly coupled to the upper wrapper, wherein the venting assembly includes:
      a chimney coupled to the internal support and the upper wrapper, the chimney fluidly coupling the cooking cavity and a venting channel;
      an actuator;
      a cover operably coupled to the actuator;
      a disc coupled to an actuator shaft, the actuator shaft configured to be rotated by the actuator;
      a linkage coupled to the disc; and
      a link coupled to the cover, wherein the linkage is coupled to the link via a connector and a cam; and
   a controller configured to activate the actuator to rotationally adjust the cover relative to the chimney.

2. The cooking appliance of claim 1, further comprising:
   a fan disposed proximate to the chimney, wherein the controller is configured to activate the fan.

3. The cooking appliance of claim 1, wherein the cover includes a first cover plate and a second cover plate, and wherein the first cover plate and the second cover plate are coupled together at an engagement portion of the cover.

4. The cooking appliance of claim 1, wherein rotation of the disc by the actuator shaft causes rotation of the linkage along a first groove of the cam in a first direction, which, consequently, causes rotation of the link along a second groove of the cam in a second direction to rotate the cover relative to the chimney.

5. A ventilation system for a cooking appliance, comprising:
   an internal support defining a cooking cavity;
   an upper wrapper disposed proximate to the internal support, the upper wrapper at least partially defining a venting channel;
   a venting assembly coupled to the upper wrapper, wherein the venting assembly includes:
      a chimney in fluid communication with the venting channel via a vent opening, wherein the venting channel is in fluid communication with the cooking cavity via the vent opening and the chimney;
      an actuator;
      an actuator shaft operably coupled to the actuator;
      a linkage operably coupled to the actuator shaft;
      a cam defining a first groove and a second groove;
      a cover operably coupled to the actuator shaft, wherein the actuator is configured to drive rotation of the actuator shaft, which, consequently, causes rotation of the cover relative to the vent opening to open and close the vent opening; and
      a link coupled to the linkage via a connector, wherein the rotation of the actuator shaft causes rotation of the linkage along the cam, and wherein the rotation of the linkage causes rotation of the link via the connector, and wherein the rotation of the link causes rotation of the cover relative to the vent opening; and
   a controller communicatively coupled with the venting assembly, wherein the controller is configured to activate the venting assembly to open the vent opening.

6. The ventilation system of claim 5, wherein the venting assembly includes a support plate, wherein the actuator shaft and the cover are coupled to opposing ends of the support plate.

7. The ventilation system of claim 6, wherein the cover is disposed between a surface of the upper wrapper and the support plate.

8. The ventilation system of claim 5, wherein the cover includes first and second cover plates, and wherein the actuator is configured to rotate the first and second cover plates 180°.

9. The ventilation system of claim 5, wherein the actuator is configured to drive the rotation of the linkage along the first groove in a first direction, wherein the rotation of the linkage in the first direction causes the rotation of the link along the second groove in a second direction.

10. The ventilation system of claim 5, wherein the venting assembly includes a disc coupled to the actuator shaft, and wherein the linkage is coupled to the disc.

11. A ventilation system for a cooking appliance, comprising:
   an internal support defining a cooking cavity;
   an upper wrapper disposed proximate to the internal support, the upper wrapper at least partially defining a venting channel in fluid communication with the cooking cavity via a vent opening defined in the upper wrapper and a chimney;
   a venting assembly coupled to the upper wrapper, wherein the venting assembly includes:
      a solenoid valve operable between an activated state and a deactivated state;
      a cover disposed proximate to the solenoid valve, wherein the cover includes a cover plate disposed over the vent opening and an end segment offset from the vent opening and operably coupled with the upper wrapper, and wherein the cover includes a fulcrum arm extending from the cover plate and coupled to the upper wrapper; and
   a controller communicatively coupled to the venting assembly, wherein the controller is configured to adjust the solenoid valve to the activated state to vertically move the cover relative to the vent opening to open the vent opening, and wherein when the solenoid valve is in the deactivated state the cover plate engages the vent opening and the end segment is at an oblique angle relative to a top surface of the upper wrapper.

12. The ventilation system of claim 11, wherein the cover plate is biased toward a closed position relative to the vent opening by the fulcrum arm.

13. The ventilation system of claim 11, wherein the chimney extends through the upper wrapper, and wherein the cover is configured to abut an outlet end of the chimney when in a closed position, the cover being spaced from the upper wrapper.

14. The ventilation system of claim 3, wherein the actuator is configured to rotate the first and second cover plates 18020 .

15. The cooking appliance of claim 3, further comprising:
   a support plate coupled to the upper wrapper, wherein the cover is disposed between a top surface of the upper wrapper and the support plate, and wherein the actuator shaft is coupled to a first end of the support plate and the cover is coupled to a second end of the support plate opposing the first end.

16. The cooking appliance of claim 15, wherein the engagement portion of the cover is operably coupled to the second end of the support plate, and wherein the support plate extends across the top surface of the upper wrapper and over the engagement portion of the cover.

17. The cooking appliance of claim 16, wherein the cover rotates about a rotational axis defined by the engagement portion of the cover.

18. The ventilation system of claim 11, wherein when the solenoid valve is in the activated state the end segment of the cover is parallel to the top surface of the upper wrapper.

19. The ventilation system of claim 11, wherein the cover plate is at least partially constructed of ferromagnetic material.

20. The ventilation system of claim 19, wherein the solenoid valve is configured to magnetically engage the cover plate to move the cover plate toward an opened position when the solenoid valve is in the activated state.

* * * * *